2 Sheets--Sheet 1.

M. WESSON.

Machines for Channelling Soles of Boots and Shoes.

No. 5,561. Reissued September 2, 1873.

Witnesses.
M. W. Frothingham.
L. H. Latimer.

Inventor.
Martin Wesson,
By his Attys.
Crosby & Gould

AM. PHOTO-LITHOGRAPHIC CO. N.Y. (OSBORNE'S PROCESS.)

2 Sheets--Sheet 2.
M. WESSON.
Machines for Channelling Soles of Boots and Shoes.
No. 5.561.
Reissued September 2, 1873.
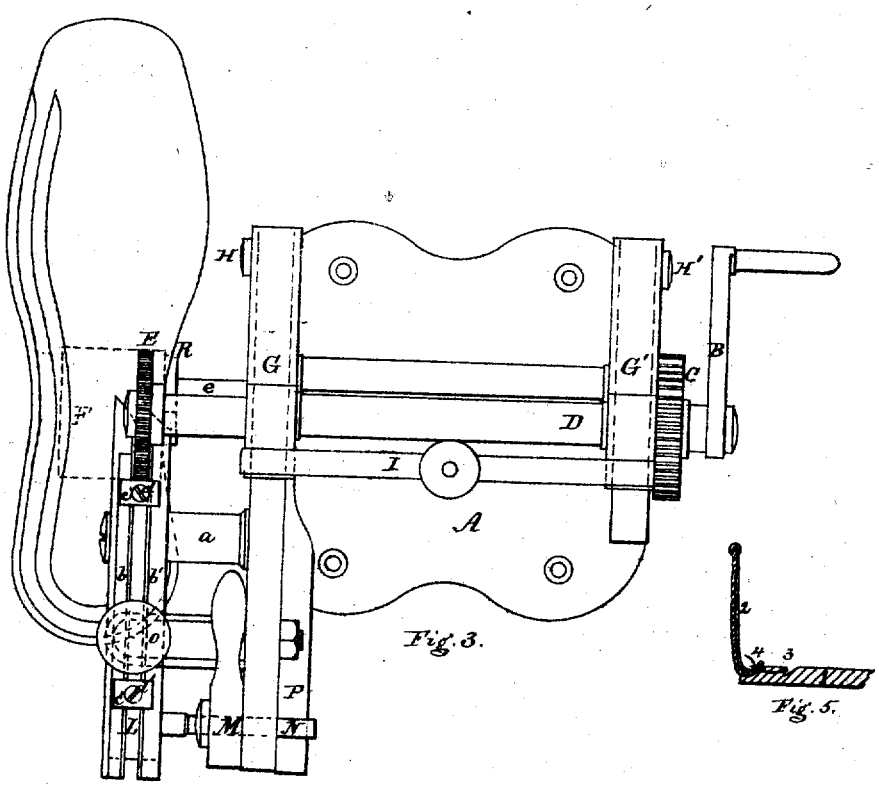
Fig. 3.
Fig. 5.
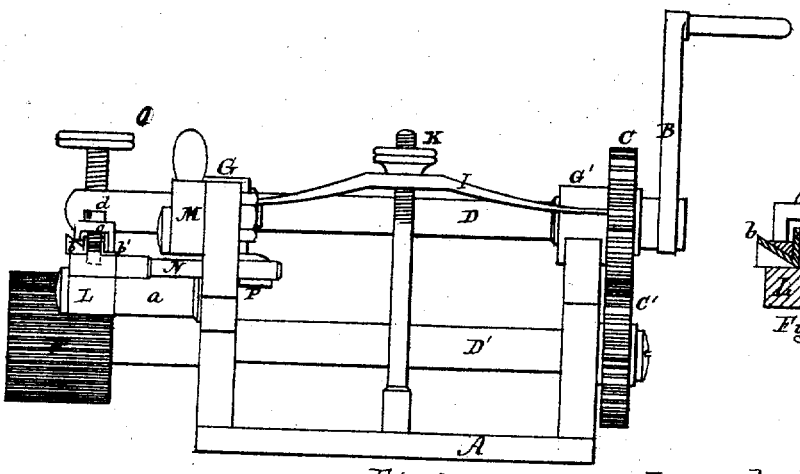
Fig. 2.
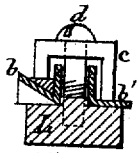
Fig. 4.
Witnesses.
M. W. Frothingham.
L. M. Latimer.
Inventor.
Martin Wesson,
By his Attys.
Crosby & Gould
AM. PHOTO-LITHOGRAPHIC Co. N.Y. (OSBORNE'S PROCESS)

UNITED STATES PATENT OFFICE.

MARTIN WESSON, OF SPRINGFIELD, MASSACHUSETTS, ASSIGNOR TO GORDON McKAY, TRUSTEE OF THE McKAY SEWING-MACHINE ASSOCIATION.

IMPROVEMENT IN MACHINES FOR CHANNELING SOLES OF BOOTS AND SHOES.

Specification forming part of Letters Patent No. 24,182, dated May 24, 1859; reissue No. 1,586, dated December 1, 1863; extended seven years; reissue No. 5,561, dated September 2, 1873; application filed August 28, 1873.

*To all whom it may concern:*

Be it known that I, MARTIN WESSON, of Springfield, in the county of Hampden and Commonwealth of Massachusetts, have invented a new and useful Machine for Channeling and Edging the Soles of Boots and Shoes; and I do hereby declare that the following is a full, clear, and exact description of the same, reference being had to the accompanying drawings making a part of this specification, in which—

Figures 7, 8:
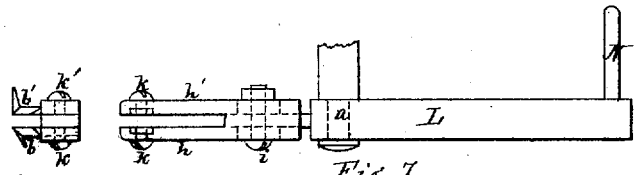
Figure 6:
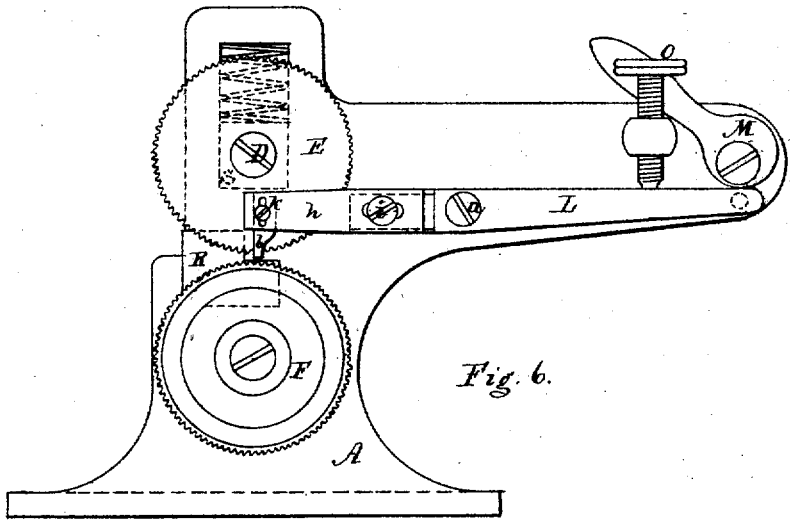
Figure 1:
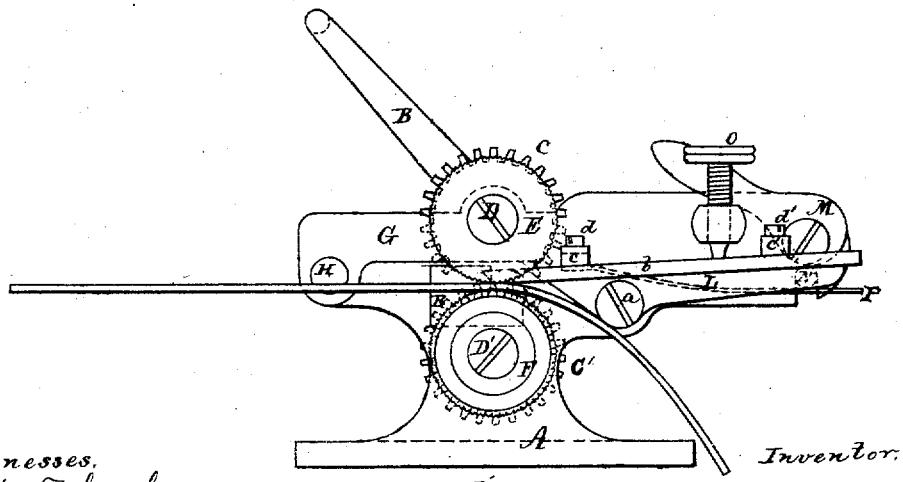

Figure 1 is an end elevation. Fig. 2 is a side elevation. Fig. 3 is a plan, and Fig. 4 a section of the knives and knife-holder on a larger scale. Fig. 5 is a cross-section of a portion of a shoe-sole with the upper attached, showing the use of the grooves in the sole for one kind of shoe. Fig. 6 is an end view of a machine comprising substantially the same parts but differently arranged. Fig. 7 is a top view, and Fig. 8 an end view, of the knife-holder and knives used in the machine represented in Fig. 6.

The same letters of reference indicate corresponding parts in each of the several figures.

The object of this invention is to produce a cheap and convenient machine for cutting the grooves in the soles of boots and shoes for the purpose of sewing the uppers to the soles.

The uppers are attached to the soles in several different ways; but in all or nearly all kinds of sewed work certain grooves in the sole are necessary. One method of attaching is represented in Fig. 5, in which 1 is a portion of a sole; 2, the upper; 3, the channel or inner groove in the sole; 4, the edge-groove for the reception of the upper.

Previous to the invention of my machine, this operation was almost entirely performed by hand, which is a slow and tedious operation, and altogether very unsatisfactory, for, in forming the edge-groove with a knife, it can at best be only a common bevel, and that of a very imperfect kind, for at times the knife will cut deeper than at other times, thereby producing an edge of very unequal thickness, whereas with this machine a corner of any desirable form is taken out, leaving the edge of exactly the same thickness at every point. Then for the channel or inner groove this machine has even more advantages than for the edge, for when the channel is formed by hand, it is simply a gash cut in the sole obliquely, and as nearly of an equal depth as is convenient, but, having no guide, the depth must be very unequal; and it often happens that this cut extends so nearly through the sole that it wears through at that place long before the rest of the shoe is gone. Now, by this machine, a three-cornered strip is taken out, leaving it clear work in stitching, and also leaving the leather of an equal thickness under different parts of the channel. Of course this machine is equally applicable to the manufacture of any kind of shoes in which it is necessary to cut grooves or channels in the soles. But a description of the styles shown in Fig. 5 is sufficient to illustrate the advantages of the machine. This machine does not cut out the sole, as that can be done better by striking out with the dies as is at present practiced, and therefore, by not attempting too much, the machine is enabled to perform its duties with the greatest freedom and accuracy.

To enable those skilled in the art to fully understand my invention, I will proceed to describe the construction and operation of the machine.

I will first describe the arrangement illustrated in Figs. 1, 2, 3, and 4, leaving 6, 7, and 8 for after consideration.

A is a cast-iron bed or frame to support the other parts. B is a crank by means of which motion is communicated to the gears C C′, shafts D D′, and grooved feed-rollers E F. The shaft D is hung in the bearings G G′, which are hinged at H H′, and pressed down by the spring I, which is adjustable by the thumb-screw K. L is an adjustable knife-holder (seen in section in Fig. 4) pivoted at *a*, and holding two knives, *b b′*. *c c′* are two stirrups resting on the knives *b b′*, and holding them in their proper place by means of the two screws *d d′*, which enter the holder L. M is a hand eccentric operating on pin N in holder L. O is a thumb-screw operating on the knife-holder L, and by means of which screw the depth of the cut in the sole is regulated. P is a spring operating upon the under side of the pin N, to hold the knife-holder in contact with the screw O, thereby keeping the knives in the leather. R is a guide supported by the standard *e*, and serving to guide the sole as it is being operated upon by the feed-rollers and knives. Figs. 1 and 3 represent a sole as being operated upon.

The operation of the machine is as follows: When about to enter a sole, first revolve the eccentric M, thereby depressing the back end of the knife-holder L, and consequently elevating the cutting end of the knives, then insert the end of the sole between the feed-rolls, keeping the edge pressed against the guide R. Now, by turning the crank B, the two feed-rolls are revolved simultaneously, and the sole carried forward. As soon as the sole has fairly entered, turn back the eccentric M to the position shown in the drawing, which allows the knives to come in contact with the leather, and to enter to a certain depth, which depth is regulated by the screw O. Now turn the crank with the right hand, and guide the sole with the left, being careful to keep the edge in contact with the guide R, which is very easily done, as it seems to follow round with very little help. By loosening the screws *d d′*, the knives can be adjusted to any position by sliding them forward or back on the holder L.

I will now proceed to describe the arrangement illustrated in Figs. 6, 7, and 8. In this arrangement, the shaft D, on which is the feed-roll E, instead of being hung in bearings G G′, vibrating on H H′, and pressed down by the spring I, is held at one or both ends in sliding boxes, and the pressure produced by spiral springs, thereby doing away with the hinge H H′; also, the knife-holder L is constructed differently. As in the first arrangement, L is a lever pivoted at *a*, but, instead of providing this lever with two long knives cutting at the ends, and adjustable by sliding on the holder L, I provide the holder with two sliding pieces, *h h′*, which are slotted and fastened to the lever L by a screw, *i*. Into these sliding pieces I put upright knives, as seen in Fig. 8, which knives are held in place by screws *k k′*, working in slots in the sliding pieces *h h′*; thus, by unscrewing *i*, the knives may be adjusted horizontally, and secured in place again by tightening the same, and, by means of the screws *k k′* and their slots, the knives may be adjusted vertically.

It is evident that, as the force of the spring is adjustable, when the lower roll or wheel is considerably rough the machine may be made to operate without the upper roll or wheel, although not as perfectly as with the two feed-wheels.

Now having fully described the construction and operation of my invention, what I claim as new, and desire to secure by Letters Patent, is—

1. The combination of one or more feed-rolls, E F, knife or knives *b b′*, and guide R, or its mechanical equivalent, when operating substantially in the manner and for the purpose herein set forth.

2. The combination of lever L, sliding pieces *h h′*, and knives *b b′*, when arranged and operating as described, and forming a knife-holding arrangement for the purpose specified.

3. The mode of determining the action of the cutter or cutters in machine channeling or edging the soles of boots and shoes, consisting in the employment of the perimeter of the sole-edge as a pattern.

MARTIN WESSON.

Witnesses:
E. K. BELCHER,
HUGH DONNELLY.